United States Patent
Girnyk

(10) Patent No.: US 12,009,888 B2
(45) Date of Patent: Jun. 11, 2024

(54) NETWORK NODES AND METHODS PERFORMED IN A WIRELESS COMMUNICATION NETWORK

(71) Applicant: Telefonaktiebolaget LM Ericsson (publ), Stockholm (SE)

(72) Inventor: Maksym Girnyk, Solna (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 73 days.

(21) Appl. No.: 17/779,201

(22) PCT Filed: Dec. 6, 2019

(86) PCT No.: PCT/SE2019/051245
§ 371 (c)(1),
(2) Date: May 24, 2022

(87) PCT Pub. No.: WO2021/112732
PCT Pub. Date: Jun. 10, 2021

(65) Prior Publication Data
US 2023/0035971 A1 Feb. 2, 2023

(51) Int. Cl.
*H04B 7/0456* (2017.01)
*H04W 24/02* (2009.01)
*G06N 20/10* (2019.01)

(52) U.S. Cl.
CPC .......... *H04B 7/0456* (2013.01); *H04W 24/02* (2013.01); *G06N 20/10* (2019.01)

(58) Field of Classification Search
CPC ........ H04B 7/0456; G06N 3/10; H04W 24/02
See application file for complete search history.

(56) References Cited

U.S. PATENT DOCUMENTS

2021/0173893 A1* 6/2021 Luo .................... G11C 13/0069

FOREIGN PATENT DOCUMENTS

EP          3557782 A1   10/2019

OTHER PUBLICATIONS

Huang et al. "Deep learning-based Millimeter Wave Massive MIMO for Hybrid precoding";IEEE, vol. 68 No.3, Mar. 2019 (Year: 2019).*
Indian Office Action dated Dec. 7, 2022 for Patent Application No. 202217038345, consisting of 6-pages.
EPO Communication with Supplementary European Search Report dated Jul. 5, 2023 for Patent Application No. 19954779.5, consisting of 9-pages.
Aljumaily et al.; Machine Learning Aided Hybrid Beamforming in Massive-MIMO Millimeter Wave Systems; 2019 IEEE International Symposium on Dynamic Spectrum Access Networks (DySPAN); Nov. 2019, consisting of 6-pages.

(Continued)

*Primary Examiner* — Rahel Guarino
(74) *Attorney, Agent, or Firm* — Weisberg I.P. Law, P.A.

(57) ABSTRACT

Embodiments herein relate to a method performed by a network node for handling communication in a wireless communication network. The network node selects a precoder given a channel based on output of a trained computational model, trained with approximated precoders or channel matrices mapped to preferred precoders, and transmits data over the channel using the selected precoder.

17 Claims, 11 Drawing Sheets

(56) References Cited

OTHER PUBLICATIONS

Chen et al.; Complex-BP-Neural_Network-based Hybrid Precoding for Millimeter Wave Multiuser Massive MIMO Systems; arXiv; Aug. 1, 2019, consisting of 6-pages.

International Search Report and Written Opinion dated Oct. 12, 2020 for International Application No. PCT/SE2019/051245 filed Dec. 6, 2019, consisting of 11-pages.

Xinliang Zhang et al.; Deep Learning based Precoding for the MIMO Gaussian Wiretap Channel; Department of Electrical and Computer Engineering; Villanova University; Sep. 17, 2019, consisting of 6-pages.

Hongji Huang et al.; Deep-Learning-Based Millimeter-Wave Massive MIMO for Hybrid Precoding; IEEE Transactions on Vehicular Technology, vol. 68, No. 3; Mar. 2019, consisting of 6-pages.

Xiaofeng Li et al.; Deep Learning for Direct Hybrid Precoding in Millimeter Wave Massive MIMO Systems; 2019 53rd Asilomar Conference on Signals, Systems and Computers, 2019, consisting of 6-pages.

Changshan Xiao et al.; Globally Optimal Linear Precoders for Finite Alphabet Signals Over Complex Vector Gaussian Channels; IEEE Transactions on Signal Processing, vol. 59, No. 7; Jul. 2011, consisting of 14-pages.

3GPP TS 38.300 V15.2.0; 3rd Generation Partnership Project; Technical Specification Group Radio Access Network; NR; NR and NG-RAN Overall Description; Stage 2 (Release 15); Jun. 2018, consisting of 87-pages.

\* cited by examiner

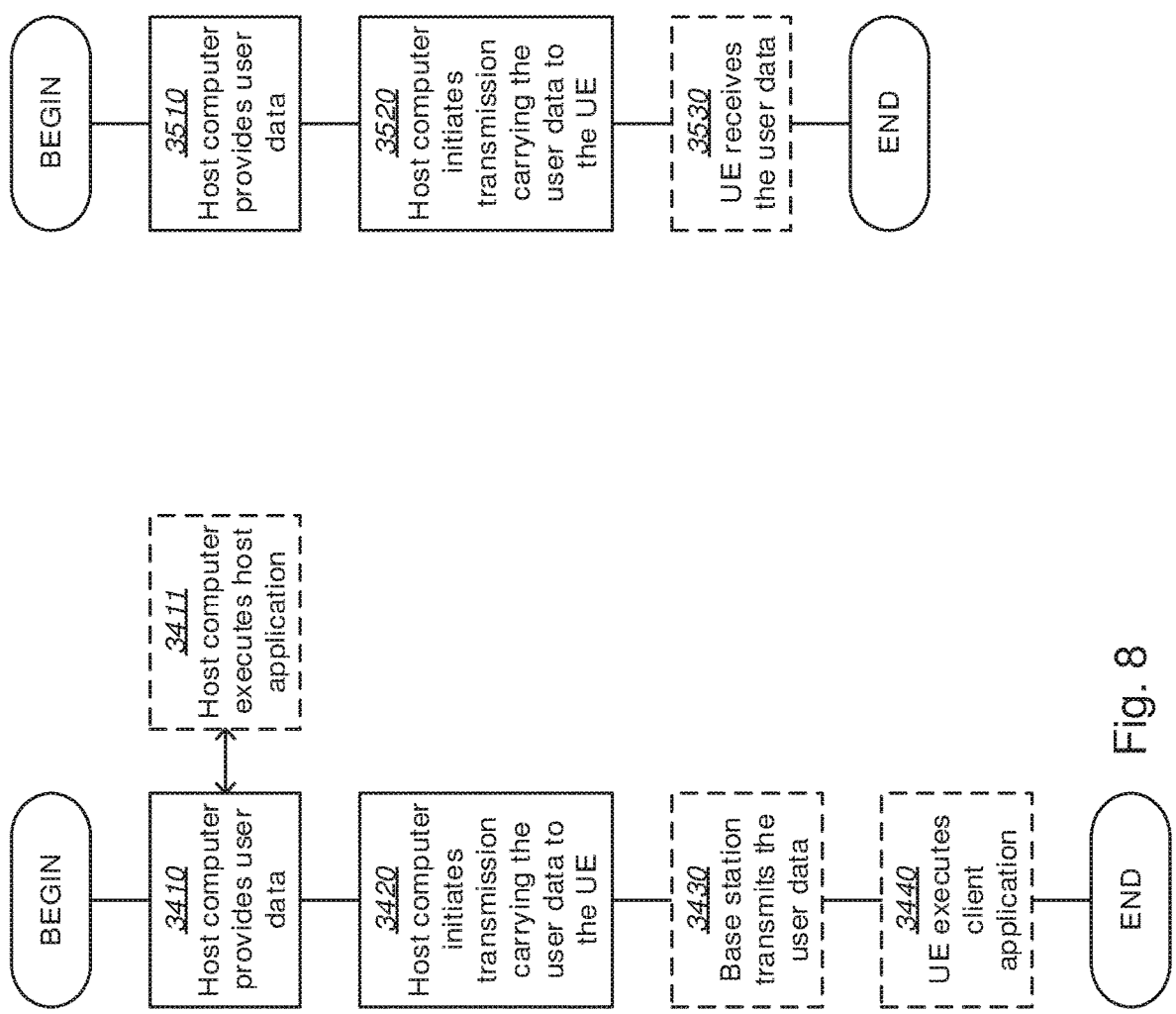

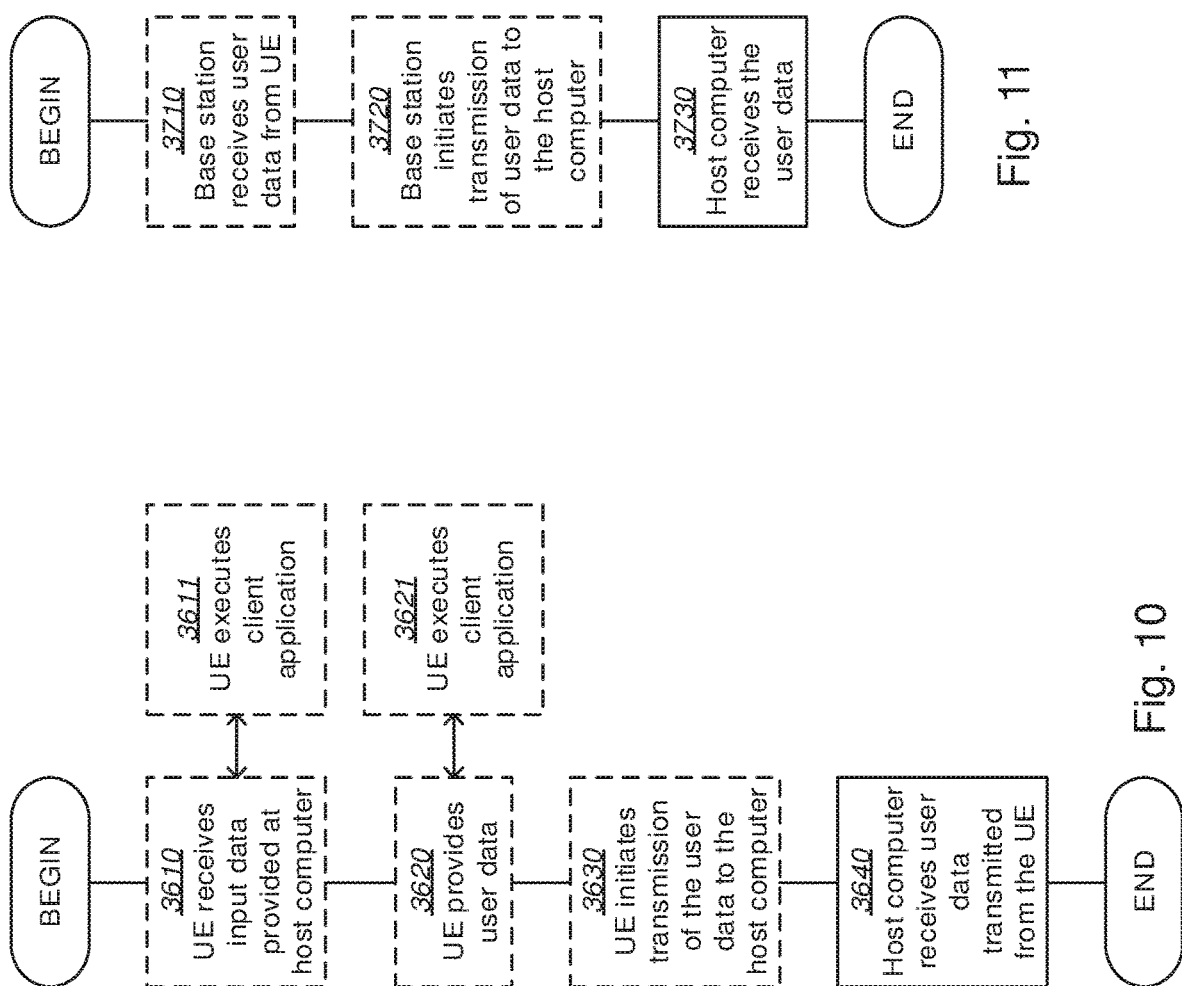

NETWORK NODES AND METHODS PERFORMED IN A WIRELESS COMMUNICATION NETWORK

CROSS-REFERENCE TO RELATED APPLICATION

This application is a Submission Under 35 U.S.C. § 371 for U.S. National Stage Patent Application of International Application Number: PCT/SE2019/051245, filed Dec. 6, 2019 entitled "NETWORK NODES AND METHODS PERFORMED IN A WIRELESS COMMUNICATION NETWORK FOR PRECODER OPTIMIZATION," the entirety of which is incorporated herein by reference.

TECHNICAL FIELD

Embodiments herein relate to a network node, a model network node and methods performed therein regarding communication in a wireless communication network. Furthermore, a computer program product and a computer-readable storage medium are also provided herein. Especially, embodiments herein relate to handling or enabling communication, e.g. selecting precoder, in a wireless communication network.

BACKGROUND

In a typical wireless communication network, User Equipment (UE), also known as wireless communication devices, mobile stations, stations (STA) and/or wireless devices, communicate via a Radio Access Network (RAN) to one or more core networks (CN). The RAN covers a geographical area which is divided into service areas or cell areas, with each service area or cell area being served by a radio network node such as an access node e.g. a Wi-Fi access point or a radio base station (RBS), which in some radio access technologies (RAT) may also be called, for example, a NodeB, an evolved NodeB (eNodeB) and a gNodeB (gNB). The service area or cell area is a geographical area where radio coverage is provided by the radio network node. The radio network node operates on radio frequencies to communicate over an air interface with the wireless devices within range of the access node. The radio network node communicates over a downlink (DL) to the wireless device and the wireless device communicates over an uplink (UL) to the access node. The radio network node may be a distributed node comprising a remote radio unit and a separated baseband unit.

A Universal Mobile Telecommunications System (UMTS) is a third generation telecommunication network, which evolved from the second generation (2G) Global System for Mobile Communications (GSM). The UMTS terrestrial radio access network (UTRAN) is essentially a RAN using wideband code division multiple access (WCDMA) and/or High-Speed Packet Access (HSPA) for communication with user equipment. In a forum known as the Third Generation Partnership Project (3GPP), telecommunications suppliers propose and agree upon standards for present and future generation networks and UTRAN specifically, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. The RNCs are typically connected to one or more core networks.

Specifications for the Evolved Packet System (EPS) have been completed within the 3$^{rd}$ Generation Partnership Project (3GPP) and this work continues in the coming 3GPP releases, such as 4G and 5G networks. The EPS comprises the Evolved Universal Terrestrial Radio Access Network (E-UTRAN), also known as the Long-Term Evolution (LTE) radio access network, and the Evolved Packet Core (EPC), also known as System Architecture Evolution (SAE) core network. E-UTRAN/LTE is a 3GPP radio access technology wherein the radio network nodes are directly connected to the EPC core network. As such, the Radio Access Network (RAN) of an EPS has an essentially "flat" architecture comprising radio network nodes connected directly to one or more core networks.

With the emerging 5G technologies also known as new radio NR, the use of very many transmit- and receive-antenna elements is of great interest as it makes it possible to utilize beamforming, such as transmit-side and receive-side beamforming. Transmit-side beamforming means that the transmitter can amplify the transmitted signals in a selected direction or directions, while suppressing the transmitted signals in other directions. Similarly, on the receive-side, a receiver can amplify signals from a selected direction or directions, while suppressing unwanted signals from other directions.

Beamforming allows the signal to be stronger for an individual connection. On the transmit-side this may be achieved by a concentration of the transmitted power in the desired direction(s), and on the receive-side this may be achieved by an increased receiver sensitivity in the desired direction(s). This beamforming enhances throughput and coverage of the connection. It also allows reducing the interference from unwanted signals, thereby enabling several simultaneous transmissions over multiple individual connections using the same resources in the time-frequency grid, so-called multi-user Multiple Input Multiple Output (MIMO).

Increased communication data rates are an inherent requirement for enabling the 5G-connected world. Multiple-antenna technology is of great help for achieving this goal, providing the opportunities to focus the energy in narrow beams, spatially multiplex data streams or providing robustifying diversity. Multi-antenna deployments and techniques constitute a core part of the 5G NR standard.

A multi-antenna communication system is described as a so-called MIMO communication channel. FIG. 1 shows a single user (SU)-MIMO channel.

The NR standard is based on orthogonal frequency-division multiplexing (OFDM) in the downlink, and discrete Fourier transform (DFT)-precoded OFDM in the uplink, and hence for a given time and/or frequency resource element the received vector y of size N×1 is modeled by $$y = HGx + n,$$

where H is the N×M matrix describing the channel coefficients, n is the N×1 vector of noise/interference observed at the receiver and x is the transmitted symbol vector of size M×1.

Matrix G is the so-called precoder or precoder matrix that adjusts the transmission to the radio environment, and can be either wideband or frequency-selective. In the frequency division duplex (FDD) case, the precoder matrix is selected from a codebook of possible precoder matrices and is typically indicated by means of a precoder matrix indicator (PMI), which specifies a unique precoder matrix in the codebook for a given number of symbol streams. This strategy allows the transmitter to adjust the precoder without explicit knowledge of the channel state information (CSI), as the latter is usually unavailable in the FDD operation mode. In time division duplex (TDD) systems, however, there is a possibility to obtain the explicit CSI via channel reciprocity. That is, uplink sounding reference signals (SRS) are sent by the UE to estimate the downlink channel matrix H. Having such an estimate, the transmitter at the radio network node can then optimize the precoder matrix G.

In practical multi-antenna systems, the optimization is done by means of a singular-value decomposition (SVD) based solution that exploits the eigenvectors of the channel matrix H. The rationale of such an approach is based on the formula for the maximum theoretically achievable data rate of a single-user MIMO channel. The latter is given by Shannon's channel capacity C, i.e., $$C = \log \det(I_N + HGG^H H^H),$$

where G is the optimum precoder matrix that is typically obtained by the right singular vectors of the channel matrix (obtained by its SVD) alongside waterfilling over the inverse of the channel eigenvalues. Note that to have the rate in bits/s/Hz the logarithm is taken with base 2.

Notwithstanding, the above solution is not optimal as it adjusts the precoder matrix to maximize the capacity of the channel. The latter is, however, never achieved in practice (except for the very low-SNR operation region) since it is based on the assumption of purely information-theoretical random Gaussian signaling. In practice, communication systems are operating with finite-alphabet signal constellations, such as, e.g., quadrature phase shift keying (QPSK), 8-phase shift keying (PSK), 16-quadrature amplitude modulation (QAM). The truly optimal solution should, therefore, rely on an expression of the actual achievable data rate instead.

The achievable data rate, e.g. in bits/s/Hz, for finite-alphabet signals is given by the constellation-constrained mutual information between y and x $$I(y; x \mid H, G) = \\ M \log |S| - \frac{1}{|S|^M} \sum_{m=1}^{|S|^M} \mathbb{E}_n \left\{ \log \sum_{k=1}^{|S|^M} \exp\left(-\|HG(x_m - x_k) + n\|^2 - \|n\|^2\right) \right\}, \# \quad (1)$$

where S represents the set of all points of the given signal constellation, and $E_n\{\cdot\}$ stands for the expectation with respect to the distribution of the received noise vector n.

Being able to compute the expression for the achievable rate, one can formulate the optimization problem as follows $$\underset{\substack{G \\ \text{subject to power constant}}}{\text{maximize}} I(y; x \mid H, g),$$

where the power constraint corresponds to the system operating constraints. For instance, total power constraint is commonly used for the precoder optimization, that is $$tr\{G^H G\} \leq M.$$

The solution to the optimization problem above is obtained by the precoder-optimization algorithm proposed in (Xiao et al, 2011) which is sketched below Algorithm #1. Iterative Precoder-Optimization Algorithm Xiao et al, 2011.

Step 1: For a given channel H, apply singular value decomposition (SVD) to decompose $H = U_H \Sigma_H V_H$ and convert the original channel model (1) into its equivalent model (43), where x is drawn from a pre-chosen finite alphabet set (constellation).

Step 2: Choose an initial set of non-zero values for $\omega_{pq} v_{pq}$ and non-negative diagonal matrix $\Sigma_G$ with $$\text{trace}\left(\sum\nolimits_G^2\right) = N_t.$$

Choose a unitary diagonal matrix D, which does not affect the maximization of mutual information $\mathcal{I}(x;y)$.

Step 3: Compute mutual information $\mathcal{I}(x;y)$ and MMSE matrix $\Phi$. Use backtracking line search [29] to determine a step size $\mu_\Theta$ to obtain the incremental $\delta W$ before solving for $\delta \Omega_{pq}$ and $\delta v_{pq}$ fixed $\Sigma_G$. Then update unitary matrix $\Theta$.

Step 4: Update (or re-compute) mutual information $\mathcal{I}(x;j)$ and MMSE matrix $\Phi$ according to the updated matrix $\Theta$.

Step 5: Calculate the gradient for $$\sum\nolimits_G^2$$

(as follows:

$$D_G = \text{diag}\left(\sum\nolimits_H^2 \Theta \Phi \Theta^h\right) - \lambda I_N, \quad (47)$$

with $$\lambda = \frac{\text{trace}\left[\text{diag}\left(\sum\nolimits_H^2 \Theta \Phi \Theta^h\right)\right]}{N_t}.$$

Step 6: Update $$\sum\nolimits_G^2$$

by $$\sum\nolimits_G^2 + \mu_\Sigma D_G$$

with $\mu_\Sigma$ being a step size, which is determined by the backtracking line search. Set any negative diagonal entry of $$\sum\nolimits_G^2$$

to zero, before normalizing the updated non-negative $$\sum\nolimits_G^2$$

to satisfy the power constraint:

$$\text{trace}\left(\sum\nolimits_G^2\right) = N_t.$$

Step 7: If the step $\mu_\Sigma$ in Step 6 has to be (nearly) zero, then update $$\sum\nolimits_G^2$$

by $$\sum\nolimits_G^2 - \mu_\Sigma D_G$$

with $\mu_\Sigma$ being determined by the backtracking line search. Set any negative diagonal entry of $$\sum\nolimits_G^2$$

to zero, them normalize the updated non-negative $$\sum\nolimits_G^2$$

to satisfy the power constraint: trace $$\left(\sum\nolimits_G^2\right) = N_t.$$

Repeat Step 3 through Step 7 until convergence or until a pre-set target is reached. Then a globally optimal precoder $$G^{opt} = V_H \sum\nolimits_G^{opt} \Theta^{opt}$$

is obtained.

It can be seen from the above that the optimal solution does not exhibit a closed-form solution. Instead, the algorithm is iterative and is based on alternations between gradient-descent updates of eigenvalues and eigenvectors of the precoder matrix until convergence.

Note also that for each iteration of the above algorithm one may have to evaluate a gradient of the mutual-information, given by a Minimum mean-squared error (MMSE) matrix, that is computed as $$E = I_M - \frac{1}{|S|^M} \mathbb{E}_n \left\{ \frac{\left(\sum_{m=1}^{|S|^M} \sum_{k=1}^{|S|^M} x_k \exp(-\|HG(x_m - x_k) + n\|^2)\right)^2}{\sum_{m=1}^{|S|^M} \sum_{k=1}^{|S|^M} \exp(-\|HG(x_m - x_k) + n\|^2)} \right\}. \quad (2)$$

A problem with the prior-art solution is the complexity of the computation of the precoder. It can be seen that the evaluation of the expression for mutual information #(1) requires a huge number of computations for multi-antenna setups even for moderate numbers of antennas. That is, it contains three nested loops:

1. external averaging over the signal points,
2. averaging over the noise realizations in the middle,
3. internal averaging over the signal points.

Unfortunately, the two loops over the signal constellation points exhibit exponential computational complexity with respect to the number of transmit antennas, leading to huge computational times even for moderate numbers of antennas.

For example, let S be a quadrature phase shift keying (QPSK) constellation, whilst assume the transmitter is equipped with M=4 antennas. Even disregarding the averaging over the noise, the required number of evaluations of the inner exponent term becomes $(4^4)^2=65536$. Meanwhile, for a setup with M=8 antennas this number explodes to $(4^8)^2=4.295\times10^9$ computations.

Note that in addition to the computation of mutual information #(1), one has to also evaluate the MMSE matrix #(2). Namely there are three more nested computation loops, which increases the complexity even further.

This all makes conventional precoding optimization infeasible for systems quipped with large antenna arrays, such as massive MIMO.

SUMMARY

An object of embodiments herein is to provide a mechanism that enables communication in the wireless communication network in an efficient manner.

According to an aspect the object is achieved by providing a method performed by a network node for handling communication in a wireless communication network. The network node selects a precoder given a channel based on output of a trained computational model, trained with approximated precoders or channel matrices mapped to preferred precoders. The network node further transmits data over the channel using the selected precoder.

According to another aspect the object is achieved by providing a method performed by a model network node for handling communication in a wireless communication network. The model network node trains a computational model with approximated precoders or channel matrices mapped to preferred precoders for selecting a precoder given a channel based on an output of the trained computational model. The model network node further transfers the trained computational model or the output of the computational model to a network node.

According to yet another aspect the object is achieved by providing a network node for handling communication in a wireless communication network. The network node is configured to select a precoder given a channel based on output of a trained computational model, trained with approximated precoders or channel matrices mapped to preferred precoders. The network node is further configured to transmit data over the channel using the selected precoder.

According to still another aspect the object is achieved by providing a model network node for handling communication in a wireless communication network. The model network node is configured to train a computational model with approximated precoders or channel matrices mapped to preferred precoders for selecting a precoder given a channel based on an output of the trained computational model. The model network node is further configured to transfer the trained computational model or the output of the computational model to a network node such as a UE or a radio network node.

It is furthermore provided herein a computer program product comprising instructions, which, when executed on at least one processor, cause the at least one processor to carry out any of the methods above, as performed by the network nodes, respectively. It is additionally provided herein a computer-readable storage medium, having stored thereon a computer program product comprising instructions which, when executed on at least one processor, cause the at least one processor to carry out the method according to any of the methods above, as performed by the network nodes, respectively.

Embodiments herein propose a low-complexity alternative to the prior-art precoder optimization routine. It is based on using a computational model such as a trained ML-based model that would learn e.g. the mapping between approximated precoders, such as SVD-based precoders, and the optimal precoder (computed with high granularity in the offline training phase). In the online inference phase, the trained ML model may then be used on new channel observations to predict an optimal precoder based on e.g. a quickly computed SVD-based precoder matrix. Embodiments herein provide a selection of precoder that is reduced in complexity, while maintaining near-optimal performance. Thus, the embodiments herein provide an efficient manner of selecting a precoder for enabling communication.

BRIEF DESCRIPTION OF THE DRAWINGS

Embodiments will now be described in more detail in relation to the enclosed drawings, in which:

FIGS. 8-11 are flowcharts illustrating methods implemented in a communication system including a host computer, a base station and a user equipment.

DETAILED DESCRIPTION

Embodiments herein may be described within the context of 3GPP NR radio technology (3GPP TS 38.300 V15.2.0 (2018-06)), e.g. using gNB as the radio network node. It is understood, that the problems and solutions described herein are equally applicable to wireless access networks and user-equipment (UE) implementing other access technologies and standards. NR is used as an example technology where embodiments are suitable, and using NR in the description therefore is particularly useful for understanding the problem and solutions solving the problem. In particular, embodiments are applicable also to 3GPP LTE, or 3GPP LTE and NR integration, also denoted as non-standalone NR.

Figure 1:
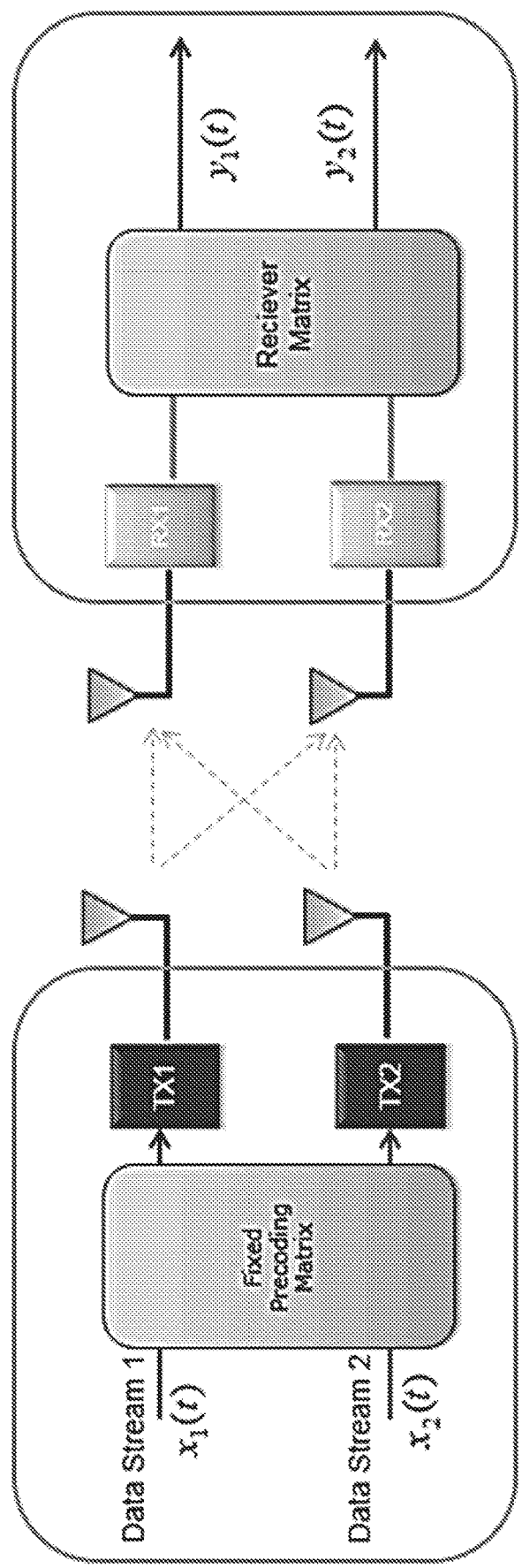
FIG. 1 is a schematic overview depicting a network nodes according to prior art.
Figure 2:
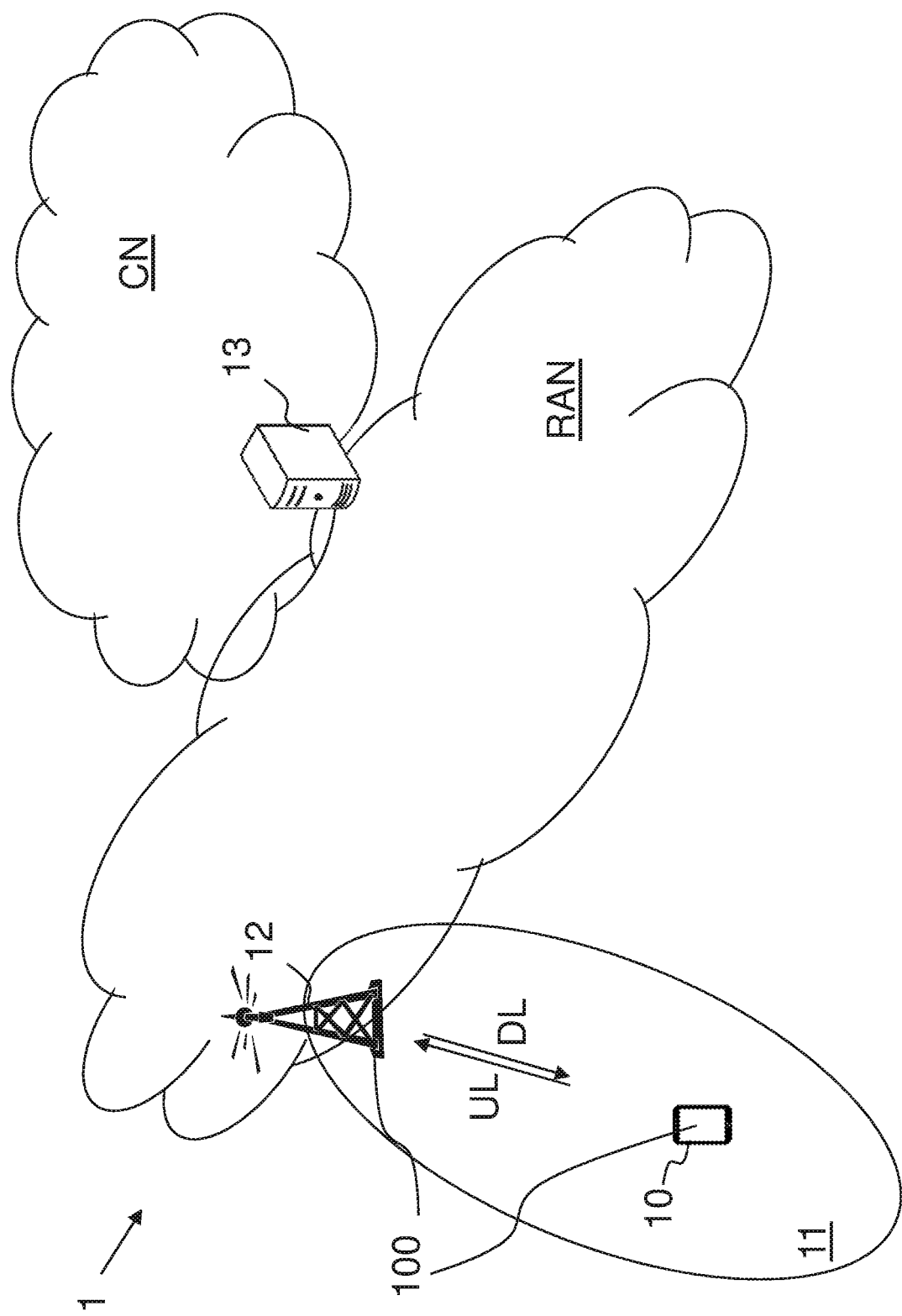
FIG. 2 is a schematic overview depicting a wireless communication network according to embodiments herein.

Embodiments herein relate to wireless communication networks in general. FIG. 2 is a schematic overview depicting a wireless communication network 1. The communication network 1 comprises e.g. one or more RANs and one or more CNs. The communication network 1 may use one or a number of different technologies, such as Wi-Fi, Long Term Evolution (LTE), LTE-Advanced, Fifth Generation (5G), Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in 5G systems, however, embodiments are also applicable in further development of the existing communication systems such as e.g. a 5G, WCDMA and LTE.

In the wireless communication network 1, wireless devices e.g. a UE 10 such as a mobile station, a non-access point (non-AP) STA, a STA, a user equipment and/or a wireless terminal, communicate via one or more Access Networks (AN), e.g. RAN, to one or more CNs. It should be understood by the skilled in the art that "UE" is a non-limiting term which means any terminal, wireless communication terminal, user equipment, Machine Type Communication (MTC) device, Device to Device (D2D) terminal, IoT operable device, or node e.g. smart phone, laptop, mobile phone, sensor, relay, mobile tablets or even a small base station capable of communicating using radio communication with a network node within an area served by the network node.

The wireless communication network 1 comprises a radio network node 12 providing e.g. radio coverage over a geographical area, a service area 11, of a radio access technology (RAT), such as NR, LTE, Wi-Fi, WiMAX or similar. The radio network node 12 may be a transmission and reception point, a computational server, a base station e.g. a network node such as a satellite, a Wireless Local Area Network (WLAN) access point or an Access Point Station (AP STA), an access node, an access controller, a radio base station such as a NodeB, an evolved Node B (eNB, eNodeB), a gNodeB (gNB), a base transceiver station, a baseband unit, an Access Point Base Station, a base station router, a transmission arrangement of a radio base station, a stand-alone access point or any other network unit or node depending e.g. on the radio access technology and terminology used. The radio network node 12 may alternatively or additionally be a controller node or a packet processing node such or similar. The radio network node 12 may be referred to as a serving network node wherein the service area 11 may be referred to as a serving cell or primary cell, and the serving network node communicates with the UE 10 in form of DL transmissions to the UE 10 and UL transmissions from the UE 10. The radio network node may be a distributed node comprising a baseband unit and one or more remote radio units. The UE 10 and/or the radio network node 12 are herein referred to as a network node 100.

It should be noted that a service area may be denoted as cell, beam, beam group or similar to define an area of radio coverage.

The wireless communication network 1 may further comprise another network node or a model network node 13 such a server, application server, a computational node, a control node, a central node, a CN node, the radio network node 12, the UE 10 or similar, that is configured to train the computational model and then transmit output or the trained model to the network node 100 e.g. the UE 10 or the radio network node 12.

The methods according to embodiments herein are performed by the network node 100 or the model network node 13. As an alternative, a distributed node and functionality, e.g. comprised in a cloud, may be used for performing or partly performing the methods.

Embodiments herein propose a low-complexity alternative to the prior-art precoder optimization routine at the network node 100. The network node 100 selects a precoder given a channel based on output of a trained computational model, trained with approximated precoders or channel matrices mapped to preferred precoders. Thus, the precoder may be selected for a specific channel snapshot, and if the snapshot changes, a new more suitable precoder may be computed.

Figure 3A:
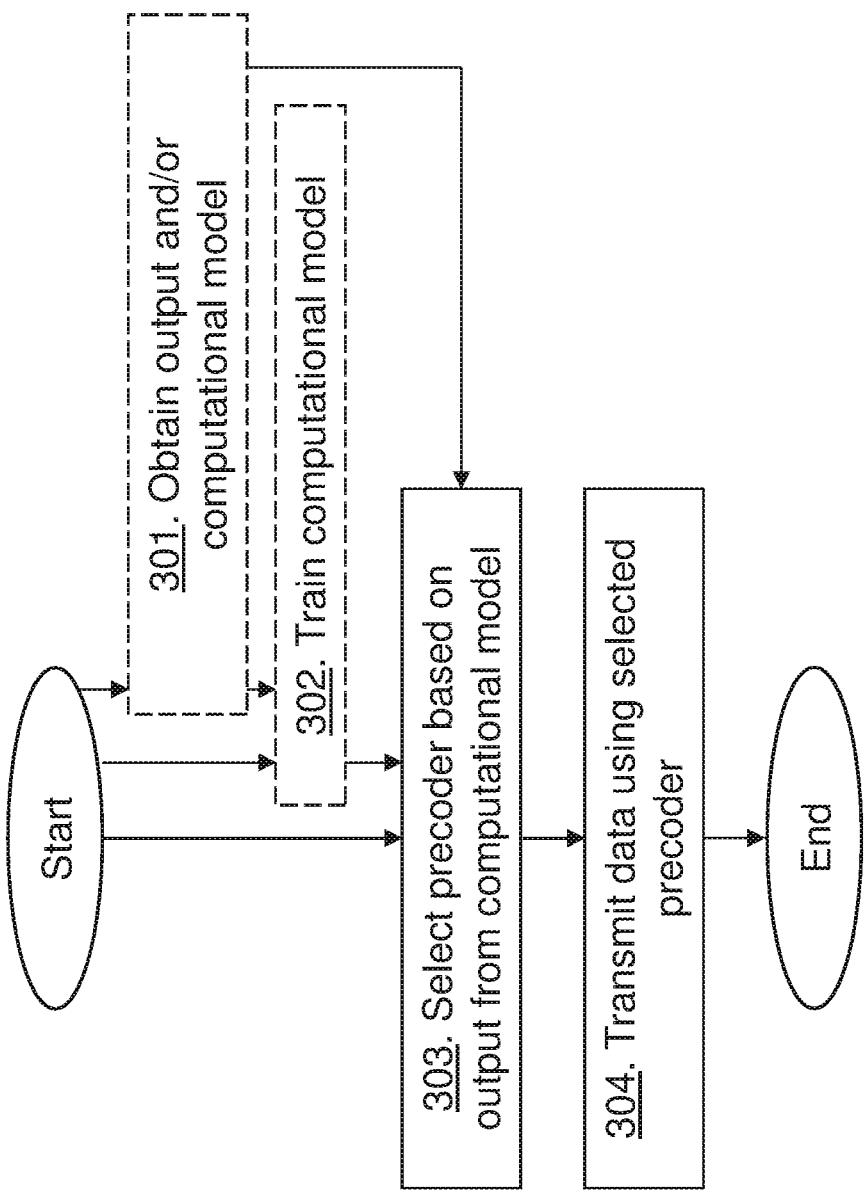
FIG. 3a is a flowchart depicting a method performed by a network node according to embodiments herein.

The method actions performed by the network node 100 for handling communication in a wireless communication network according to embodiments herein will now be described with reference to a flowchart depicted in FIG. 3a. The actions do not have to be taken in the order stated below, but may be taken in any suitable order. Actions performed in some embodiments are marked with dashed boxes.

Action 301. The network node 100 may obtain, e.g. receive or retrieve, the trained computational model or the output of the trained computational model from the model network node 13.

Action 302. The network node 100 may train the computational model.

Action 303. The network node 100 selects the precoder given a channel based on output of a trained computational model, trained with approximated precoders or channel matrices mapped to preferred precoders. The trained computational model may be a neural network, a multiple output decision tree, or a random forest model. The approximated precoders may comprise singular-value decomposition (SVD) based precoders or may be based on vectorized channel matrix per se. The precoders may be learned from channel matrix H directly. The approximated precoders may comprise optimized precoders for lower-order discrete constellations such as m-QAM, m-PSK, etc., where m is smaller than the one to be used in the online phase. For example, approx. precoders are optimized for binary phase shift keying (BPSK) (i.e., 2-QAM), while the actual constellation to be used in the transmission is 256-QAM. Thus, one could use solutions for lower-order QAM to predict precoders for higher-order QAM that are very computationally complex to optimize, e.g., for training compute optimal precoders for BPSK and 256-QAM. Then, in the online phase, one may compute only BPSK optimal precoders and use them as predictors to predict the optimal solution for 256-QAM. BPSK precoder optimization is more complex than Gaussian-signal approximation, but much lighter than that for higher-order QAM.

The network node 100 may select the precoder by selecting a precoder matrix.

The network node 100 may select the precoder for a given signal constellation such as quadrature amplitude modulation (QAM) or quadrature phase shift keyed (QPSK). The constellation affects the mutual information $$I(y; x|H, G) =$$

-continued
$$M\log|S| - \frac{1}{|S|^M}\sum_{m=1}^{|S|^M}\mathbb{E}_n\left\{\log\sum_{k=1}^{|S|^M}\exp\left(-\|HG(x_m - x_k) + n\|^2 - \|n\|^2\right)\right\},$$

where S is the constellation set. For a given S there is a certain value of I(y;x|H, G). Hence, optimal precoder for a QPSK constellation may not be optimal for a 64-QAM constellation, etc.

Action 304. The network node 100 further transmits data over the channel using the selected precoder.

Figure 3B:
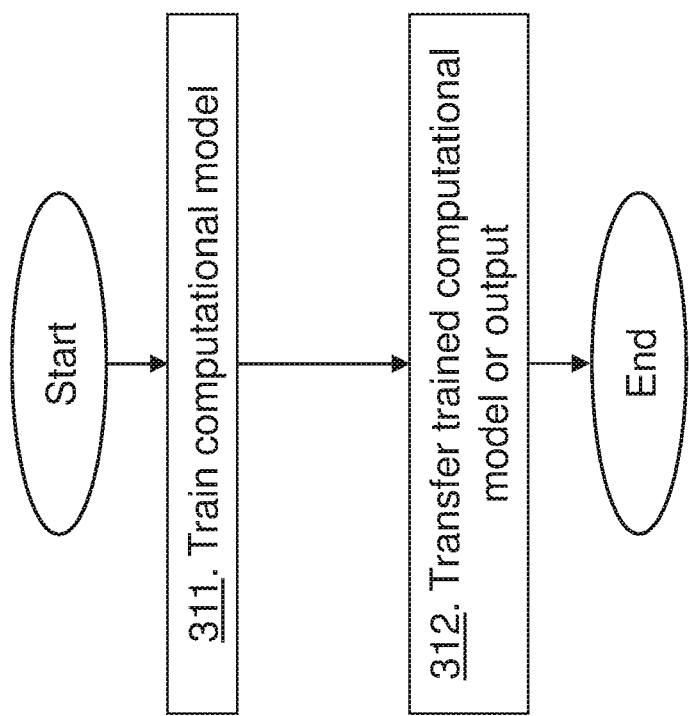
FIG. 3b is a flowchart depicting a method performed by a model network node according to embodiments herein.

The method actions performed by the model network node 13 for handling communication in a wireless communication network according to embodiments herein will now be described with reference to a flowchart depicted in FIG. 3b. The actions do not have to be taken in the order stated below, but may be taken in any suitable order.

Actions performed in some embodiments are marked with dashed boxes.

Action 311. The model network node 13 trains the computational model with approximated precoders or channel matrices mapped to preferred precoders for selecting a precoder given a channel based on an output of the trained computational model.

Action 312. The model network node 13 transfers the trained computational model or the output of the computational model to the network node 100 e.g. the radio network node 12 or the UE 10 for faster and more efficient precoder computation.

Embodiments herein use supervised learning to train, e.g. an offline training phase at the model network node 13 or the network node 100 such as the radio network node 12 or the UE 10, the computational model on a large dataset of channel observations and optimized precoders. Based on this computational model, the optimized precoder is then obtained for new channel realizations, yet unseen by the computational model, also referred to as the online inference phase.

As an example, a MIMO channel matrix weighted with the signal to noise ratio (SNR) value is observed; for each such observation, an optimal precoder may be computed based on the given modulation scheme and using either true expressions of mutual information and MMSE matrix, or accurate approximations thereof.

Based on the available data, one could quickly compute the SVD-based precoder according to $$G = V_H S_G,$$

where $V_H$ is the matrix consisting of right singular vectors of the channel (obtained from the singular-value decomposition-SVD-of the channel matrix; $H = U_H E_H V_H^H$), and $S_G$ is a diagonal matrix, whose entries are given by $$[S_G]_{m,m} = \sqrt{\left(\frac{1}{v} - \frac{1}{[\sum_H]_{m,m}}\right)^+}, \forall m \in \{1, \dots, M\},$$

where $(\cdot)^+ = \max\{\cdot, 0\}$, and v is chosen so that the power constraint $\text{tr}\{G^H G\}M$ is satisfied.

Assuming that there is a one-to-one mapping between the SVD precoder and an optimal precoder for a finite-alphabet constellation, the computational model could learn that mapping by means of a machine-learning (ML) method that solves the problem of multiple-output regression. For instance, a neural network is known to be a universal function approximator, and hence is a good candidate for such an ML model. Other potential alternatives are multiple-output decision tree and random forest.

To illustrate the idea a neural network is trained based on a dataset consisting of 7000 observations of a 2×2 SU-MIMO channels with e.g. Rayleigh fading, binary phase shift keying (BPSK) modulation (i.e., $x_m \in \{\pm 1\}$) and various SNR values.

The neural network is feed-forward with one hidden layer. The input and output layers have size 2×M×M, their entries being vectorized precoders (SVD-based and optimal) for the MIMO channel with real and imaginary parts stuck on top of each other. The hidden layer has size twice as large as the size on the input or output.

Then, for a new channel realization, e.g., selected as the channel matrix $$H = \begin{bmatrix} 0.1619 - 1.7154j & 0.2479 + 0.2345j \\ -0.3985 - 0.9047j & -0.2317 + 0.6240j \end{bmatrix},$$

compute the SVD precoder and use it as an input to the trained neural network. The output of the neural network (properly reshaped) provides the precoder matrix, i.e. the precoder, to be used as the optimal precoder.

Figure 4:
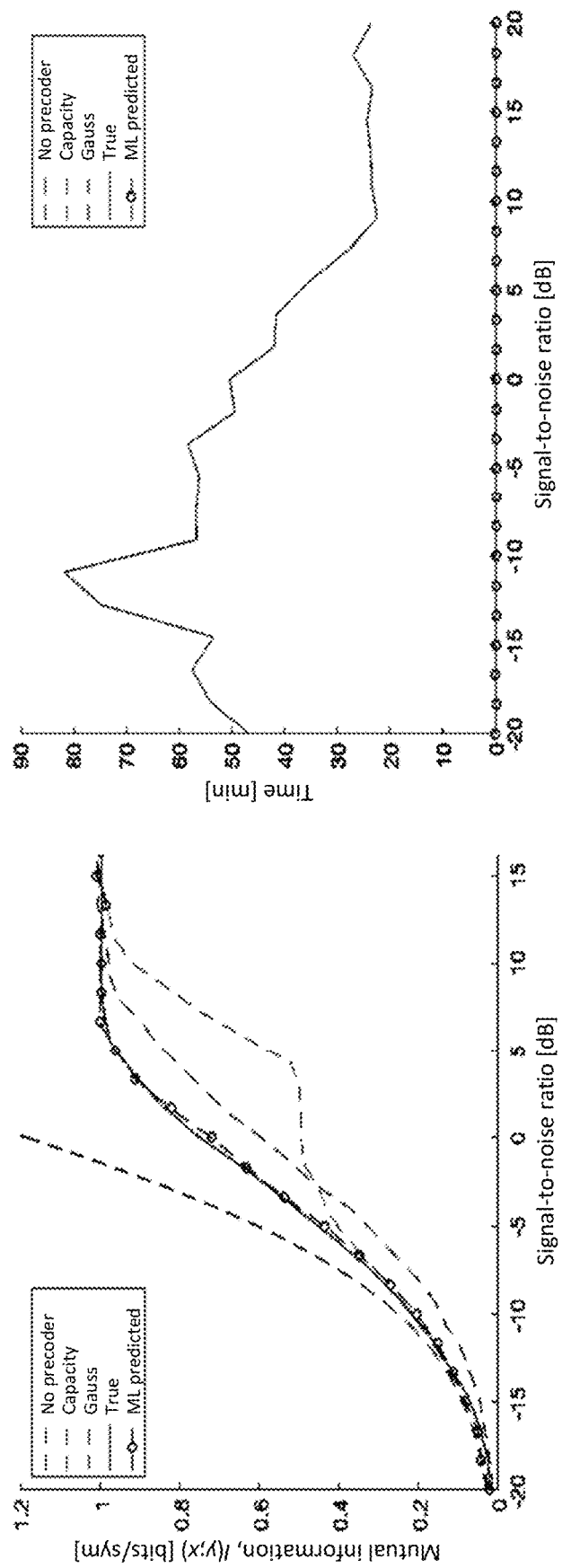
FIG. 4 are diagrams depicting signal strength of using embodiments herein compared to true results.

FIG. 4 illustrates that the network is able to learn the correspondence between the SVD precoder and the optimal precoder. It can be seen that the performance of the proposed solution is close-to-optimal, while the execution is very fast. Note the poor performance of the conventional "optimal" SVD-based solution is when it comes to finite-alphabet signaling. At the same time, note the huge gains in comparison to the actual optimal precoder.

Finally, note also that the execution time for the ML-based solution (in the right diagram of FIG. 4) is reported only for the online inference phase. This will clearly be preceded by a huge computational campaign of optimizing the precoder for the entire dataset in the offline training phase.

FIG. 4 shows achievable data rates (left) and execution time (right) as functions of SNR for a 2×2 MIMO system with BPSK signaling. Black dashed line indicates the theoretical channel capacity, gray dashed line indicates the performance of SVD-based precoding (Gauss), and that of no precoding at all. Black solid line indicates the performance of the truly optimal precoder, dashed line with o-markers indicates that of the proposed ML-based solution according to embodiments herein. As can be seen the dashed line with o-markers is pretty close the true optimal precoder and also differs a lot in time, see diagram to the right.

It is herein disclose a method for transmitting a signal from a multiple-antenna transmitter, e.g. a UE, to a receiver, such as a radio network node, comprising
  optimizing the precoder matrix based on the available channel state information (TDD or FDD reciprocity based);
  utilizing a machine-learning model trained on a set of channel observations (in an offline training phase) by
    computing an SVD-based precoder matrix
    computing a truly optimal precoder matrix (or an approximation thereof)
    learning the mapping between the two by means of the computational model (e.g., neural network or any other multiple-output regression method); and
  utilizing a prediction of the optimal precoder provided by the trained machine-learning model (in the online inference phase).

Figure 5A:
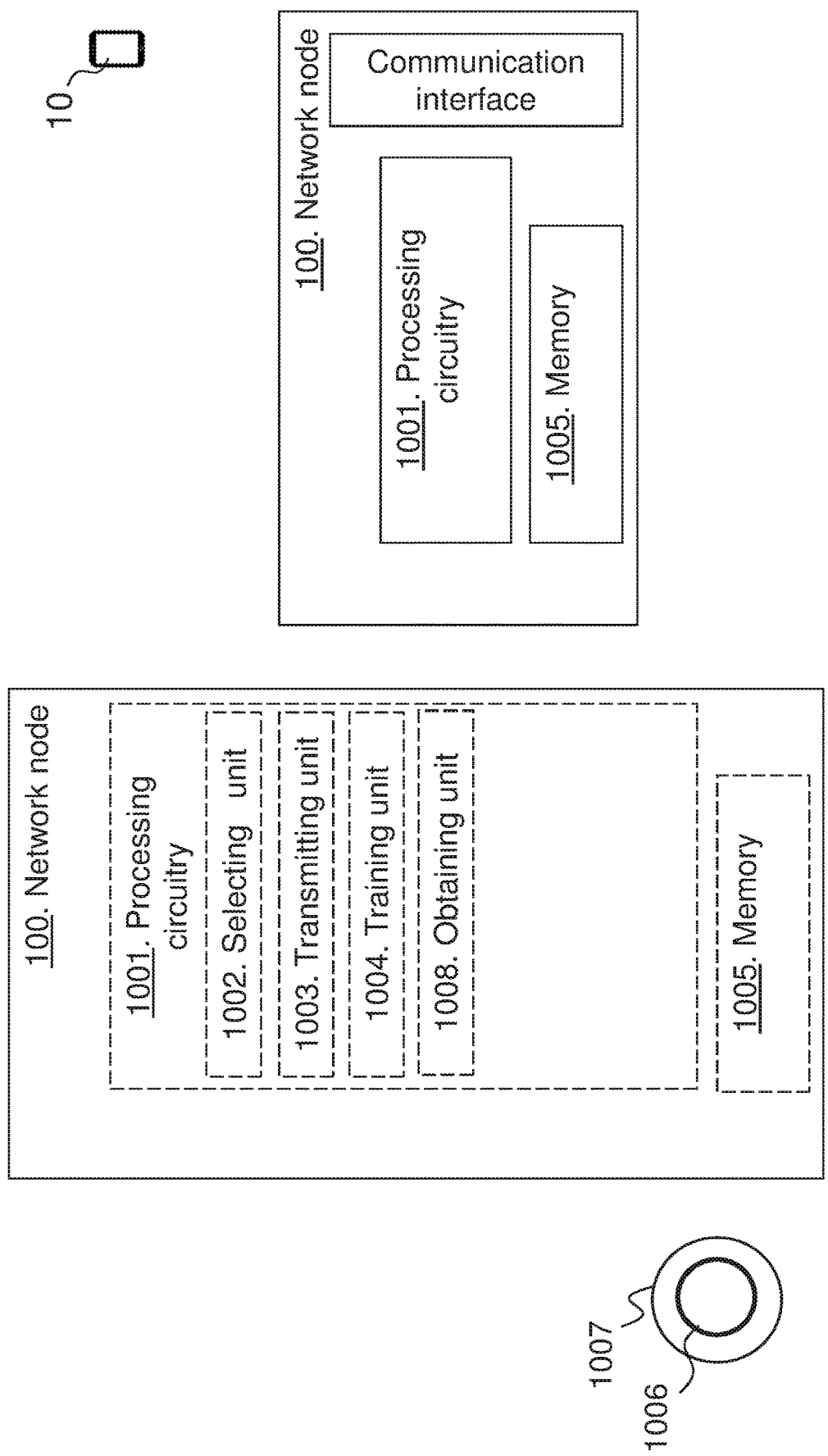
FIG. 5a is a block diagram depicting a network node according to embodiments herein.

FIG. 5a is a block diagram depicting the network node 100 for handling communication, e.g. enabling communication such as a selecting precoder, in the wireless communication network 1 according to embodiments herein.

The network node 100 may comprise processing circuitry 1001, e.g. one or more processors, configured to perform the methods herein.

The network node 100 may comprise a selecting unit 1002. The network node 100, the processing circuitry 1001 and/or the selecting unit 1002 is configured to select the precoder given the channel based on output of the trained computational model, trained with approximated precoders or channel matrices mapped to preferred precoders.

The approximated precoders may comprise singular-value decomposition, SVD, based precoders or vectorized channel matrix based precoders or optimized precoders for lower-order discrete constellations. The network node 100, the processing circuitry 1001 and/or the selecting unit 1002 may be configured to select the precoder by selecting a precoder matrix. The network node 100, the processing circuitry 1001 and/or the selecting unit 1002 may be configured to select the precoder for a given signal constellation.

The network node 100 may comprise a transmitting unit 1003, e.g. a transmitter or a transceiver. The network node 100, the processing circuitry 1001 and/or the transmitting unit 1003 is configured to transmit data over the channel using the selected precoder.

The network node 100 may comprise a training unit 1004, e.g. a calculating unit or similar. The network node 100, the processing circuitry 1001 and/or the training unit 1004 may be configured to train the computational model. The trained computational model may be a neural network, a multiple output decision tree, or a random forest.

The network node 100 may comprise an obtaining unit 1008, e.g. a receiver or a transceiver. The network node 100, the processing circuitry 1001 and/or the obtaining unit 1008 may be configured to obtain the trained computational model or the output of the trained computational model from the model network node 13.

The network node 100 further comprises a memory 1005. The memory comprises one or more units to be used to store data on, such as indications, strengths or qualities, grants, computational models, precoders, index of precoders, applications to perform the methods disclosed herein when being executed, and similar. The network node 100 comprises a communication interface comprising transmitter, receiver, transceiver and/or one or more antennas.

The methods according to the embodiments described herein for the network node 100 are respectively implemented by means of e.g. a computer program product 1006 or a computer program product, comprising instructions, i.e., software code portions, which, when executed on at least one processor, cause the at least one processor to carry out the actions described herein, as performed by the network node 100. The computer program product 1006 may be stored on a computer-readable storage medium 1007, e.g. a universal serial bus (USB) stick, a disc or similar. The computer-readable storage medium 1007, having stored thereon the computer program product, may comprise the instructions which, when executed on at least one processor, cause the at least one processor to carry out the actions described herein, as performed by the network node 100. In some embodiments, the computer-readable storage medium may be a non-transitory or transitory computer-readable storage medium.

Figure 5B:
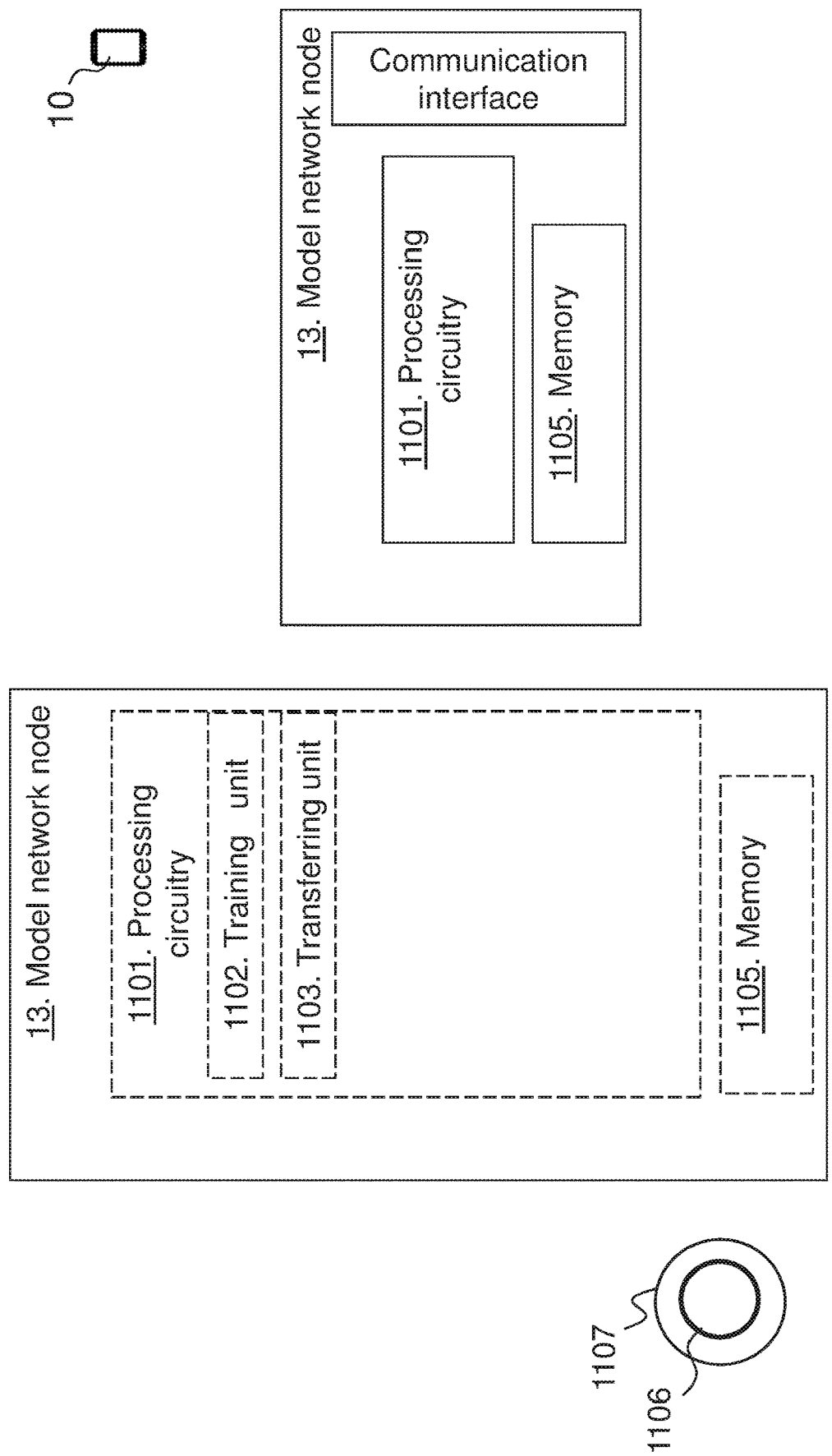
FIG. 5b is a block diagram depicting a model network node according to embodiments herein.

FIG. 5b is a block diagram depicting the model network node 13 for handling communication, e.g. enabling communication such as a selecting precoder, in the wireless communication network 1 according to embodiments herein.

The model network node 13 may comprise processing circuitry 1101, e.g. one or more processors, configured to perform the methods herein.

The model network node 13 may comprise a training unit 1102. The model network node 13, the processing circuitry 1101 and/or the training unit 1102 is configured to train the precoder given the channel based on output of the trained computational model, trained with approximated precoders or channel matrices mapped to preferred precoders. The approximated precoders may comprise singular-value decomposition, SVD, based precoders or vectorized channel matrix based precoders. The computational model may be trained for a given signal constellation. The trained computational model may be a neural network, a multiple output decision tree, or a random forest.

The model network node 13 may comprise a transferring unit 1103, e.g. a transmitter or a transceiver. The model network node 13, the processing circuitry 1101 and/or the transferring unit 1103 is configured to transfer the trained computational model or the output of the trained computational model to the network node 100 such as the radio network node 12 or the UE 10.

The model network node 13 further comprises a memory 1005. The memory comprises one or more units to be used to store data on, such as indications, strengths or qualities, grants, computational models, precoders, index of precoders, applications to perform the methods disclosed herein when being executed, and similar. The model network node 13 comprises a communication interface comprising transmitter, receiver, transceiver and/or one or more antennas.

The methods according to the embodiments described herein for the model network node 13 are respectively implemented by means of e.g. a computer program product 1006 or a computer program product, comprising instructions, i.e., software code portions, which, when executed on at least one processor, cause the at least one processor to carry out the actions described herein, as performed by the model network node 13. The computer program product 1006 may be stored on a computer-readable storage medium 1007, e.g. a USB stick, a disc or similar. The computer-readable storage medium 1007, having stored thereon the computer program product, may comprise the instructions which, when executed on at least one processor, cause the at least one processor to carry out the actions described herein, as performed by the model network node 13. In some embodiments, the computer-readable storage medium may be a non-transitory or transitory computer-readable storage medium.

In some embodiments a more general term "radio network node" is used and it can correspond to any type of radio network node or any network node, which communicates with a wireless device and/or with another network node. Examples of network nodes are NodeB, Master eNB, Secondary eNB, a network node belonging to Master cell group (MCG) or Secondary Cell Group (SCG), base station (BS), multi-standard radio (MSR) radio node such as MSR BS, eNodeB, network controller, radio network controller (RNC), base station controller (BSC), relay, donor node controlling relay, base transceiver station (BTS), access point (AP), transmission points, transmission nodes, Remote Radio Unit (RRU), Remote Radio Head (RRH), nodes in distributed antenna system (DAS), core network node e.g. Mobility Switching Centre (MSC), Mobile Management Entity (MME) etc., Operation and Maintenance (O&M), Operation Support System (OSS), Self-Organizing Network (SON), positioning node e.g. Evolved Serving Mobile Location Centre (E-SMLC), Minimizing Drive Test (MDT) etc.

In some embodiments the non-limiting term wireless device or user equipment (UE) is used and it refers to any type of wireless device communicating with a network node and/or with another UE in a cellular or mobile communication system. Examples of UE are target device, device-to-device (D2D) UE, proximity capable UE (aka ProSe UE), machine type UE or UE capable of machine to machine (M2M) communication, PDA, PAD, Tablet, mobile terminals, smart phone, laptop embedded equipped (LEE), laptop mounted equipment (LME), USB dongles etc.

The embodiments are described for 5G. However the embodiments are applicable to any RAT or multi-RAT systems, where the UE receives and/or transmit signals (e.g. data) e.g. LTE, LTE FDD/TDD, WCDMA/HSPA, GSM/GERAN, Wi Fi, WLAN, CDMA2000 etc.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them.

Several of the functions may be implemented on a processor shared with other functional components of a wireless device or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications devices will appreciate the cost, performance, and maintenance trade-offs inherent in these design choices.

Figure 6:
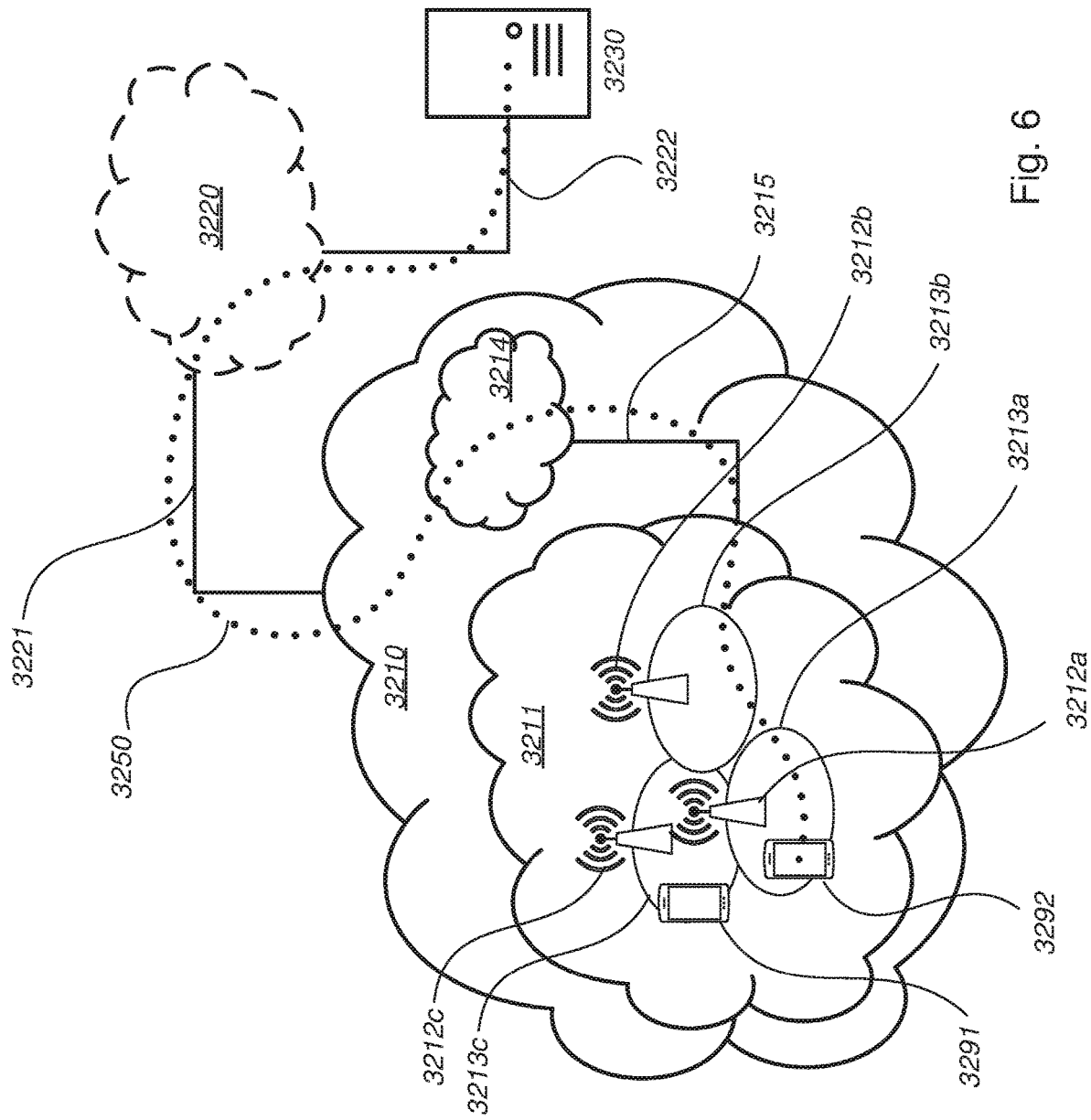
FIG. 6 schematically illustrates a telecommunication network connected via an intermediate network to a host computer.

With reference to FIG. 6, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, such as NBs, eNBs, gNBs or other types of wireless access points being examples of the radio network node 12 herein, each defining a corresponding coverage area 3213a, 3213b, 3213c. Each base station 3212a, 3212b, 3212c is connectable to the core network 3214 over a wired or wireless connection 3215. A first user equipment (UE) 3291, being an example of the UE 10, located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 6 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 7. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 7) served by the base station 3320. The communication interface 3326 may be configured to facilitate a connection 3360 to the host computer 3310. The connection 3360 may be direct or it may pass through a core network (not shown in FIG. 7) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 7:
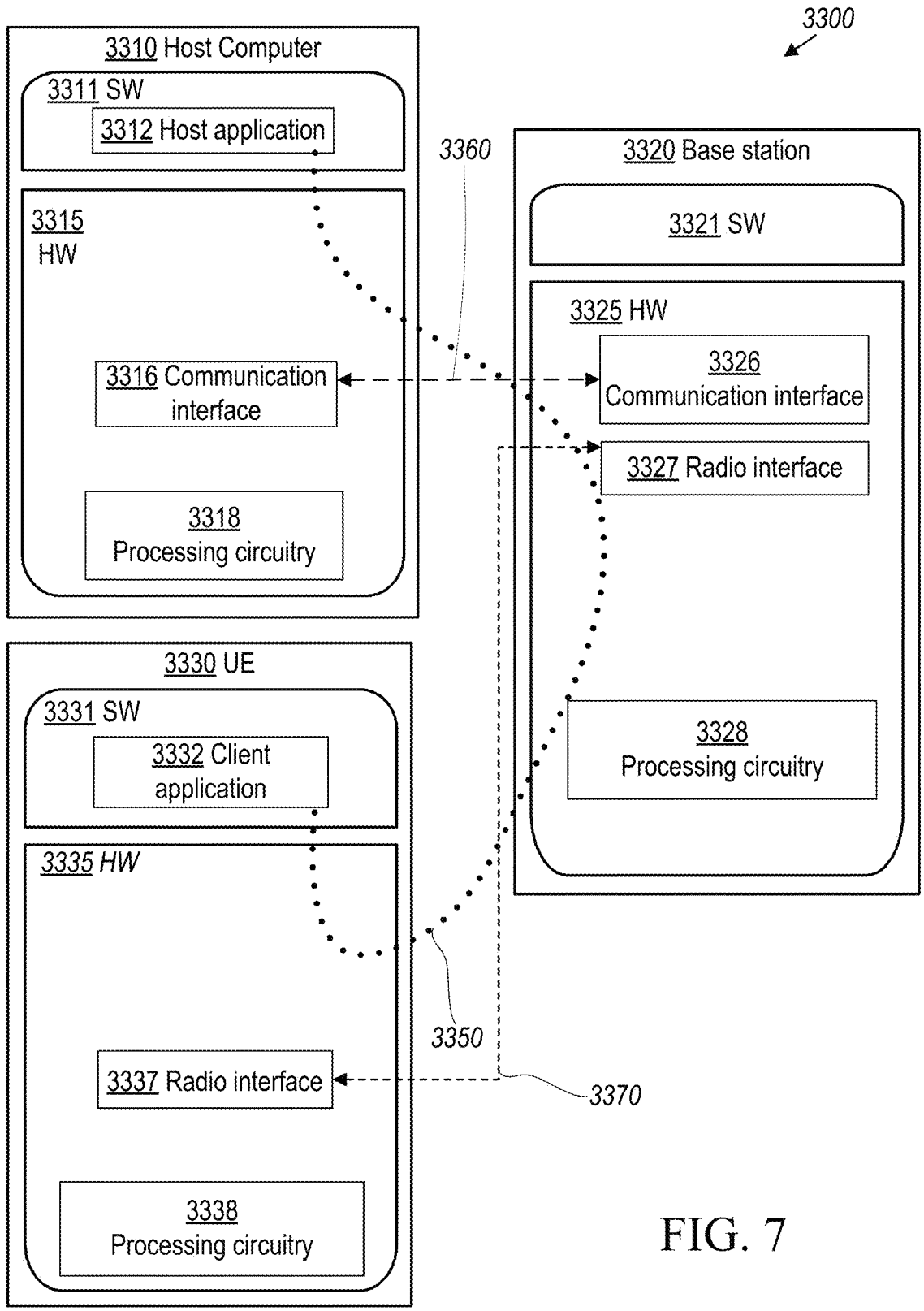
FIG. 7 is a generalized block diagram of a host computer communicating via a base station with a user equipment over a partially wireless connection.

It is noted that the host computer 3310, base station 3320 and UE 3330 illustrated in FIG. 7 may be identical to the host computer 3230, one of the base stations 3212*a*, 3212*b*, 3212*c* and one of the UEs 3291, 3292 of FIG. 6, respectively. This is to say, the inner workings of these entities may be as shown in FIG. 7 and independently, the surrounding network topology may be that of FIG. 6.

In FIG. 7, the OTT connection 3350 has been drawn abstractly to illustrate the communication between the host computer 3310 and the user equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the energy consumption of the UE and thereby provide benefits such as improved battery time, and better responsiveness.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 8 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 8 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 9 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 9 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

FIG. 10 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 10 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

FIG. 11 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 11 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

ABBREVIATIONS

CSI Channel state information
FDD Frequency division duplex
MIMO Multiple-input multiple-output
ML Machine learning
MMSE Minimum mean-squared error
PSK Phase shift keying
QAM Quadrature amplitude modulation
TDD Time division duplex
SNR Signal-to-noise ratio
ISRS Sounding reference signal
SVD Singular value decomposition
SU Single user

The invention claimed is:

1. A method performed by a network node for handling communication in a wireless communication network, the method comprising:

selecting a precoder given a channel based on output of a trained computational model, trained with one of approximated precoders and channel matrices mapped to preferred precoders;

transmitting data over the channel using the selected precoder; and the approximated precoders comprises one of singular-value decomposition, SVD, based precoders and optimized precoders for lower-order discrete constellations.

2. The method according to claim 1, further comprising: training the computational model.

3. The method according to claim 1, wherein selecting the precoder comprises selecting a precoder matrix.

4. The method according to claim 1, wherein the selection is performed for a given signal constellation.

5. The method according to claim 1, wherein the trained computational model is one of a neural network, a multiple output decision tree, and a random forest.

6. The method according to claim 1, wherein one of:
the trained computational model is obtained; and
the output of the trained computational model is obtained from a model network node.

7. The method according to claim 2, wherein selecting the precoder comprises selecting a precoder matrix.

8. The method according to claim 2, wherein the selection is performed for a given signal constellation.

9. The method according to claim 2, wherein the trained computational model is one of a neural network, a multiple output decision tree, and a random forest.

10. A method performed by a model network node for handling communication in a wireless communication network, the method comprising:
training a computational model with one of approximated precoders and channel matrices mapped to preferred precoders for selecting a precoder given a channel based on an output of the trained computational model; and
transferring one of the trained computational model and the output of the computational model to a network node.

11. A network node for handling communication in a wireless communication network, the network node being configured to:
select a precoder given a channel based on output of a trained computational model, trained with one of approximated precoders and channel matrices mapped to preferred precoders;
transmit data over the channel using the selected precoder; and
the approximated precoders comprising one of singular-value decomposition, SVD, based precoders, and optimized precoders for lower-order discrete constellations.

12. The network node according to claim 11, further being configured to train the computational model.

13. The network node according to claim 11, wherein the network node is configured to select the precoder by selecting a precoder matrix.

14. The network node according to claim 11, wherein the network node is configured to select the precoder for a given signal constellation.

15. The network node according to claim 11, wherein the trained computational model is one of a neural network, a multiple output decision tree, and a random forest.

16. The network node according to claim 11, wherein the network node is configured to obtain the one of the trained computational model and the output of the trained computational model from a model network node.

17. A model network node for handling communication in a wireless communication network, the model network node being configured to:
train a computational model with one of approximated precoders and channel matrices mapped to preferred precoders for selecting a precoder given a channel based on an output of the trained computational model, and
transfer one of the trained computational model and the output of the computational model to a network node.

* * * * *